United States Patent [19]

Loy et al.

[11] Patent Number: 5,153,234

[45] Date of Patent: Oct. 6, 1992

[54] FLAME-RETARDANT, HIGH-TEMPERATURE RESISTANT FOAMS OF POLYIMIDES

[75] Inventors: Walter Loy, Gmunden; Klaus Weinrotter, Vöcklabruck, both of Austria

[73] Assignee: Lenzing Aktiengesellschaft, Lenzing, Austria

[21] Appl. No.: 720,028

[22] Filed: Jun. 24, 1991

[30] Foreign Application Priority Data

Jul. 12, 1990 [AT] Austria .................... A1485/90

[51] Int. Cl.$^5$ ................................................ C08J 9/02
[52] U.S. Cl. ................................................ 521/157
[58] Field of Search ........................................ 521/157

[56] References Cited

U.S. PATENT DOCUMENTS

| | | | |
|---|---|---|---|
| 3,300,420 | 1/1967 | Frey | 521/157 |
| 3,772,216 | 11/1973 | Rosser | 521/157 |
| 4,077,922 | 3/1978 | Farrissey, Jr. et al. | 521/157 |
| 4,177,333 | 12/1979 | Riccitiello et al. | 521/124 |
| 4,184,021 | 1/1980 | Sawko | 521/106 |
| 4,806,573 | 2/1989 | Lee | 521/157 |
| 4,824,874 | 4/1989 | Lee | 521/157 |
| 4,830,883 | 2/1989 | Lee | 521/157 |
| 4,946,873 | 8/1990 | Carter et al. | 521/185 |

FOREIGN PATENT DOCUMENTS 2437170  3/1977  Fed. Rep. of Germany .
575968   5/1976  Switzerland .

*Primary Examiner*—Morton Foelak
*Attorney, Agent, or Firm*—Kenyon & Kenyon

[57] ABSTRACT

There are disclosed flame-retardant, high-temperature resistant polyimide foams having the general formula

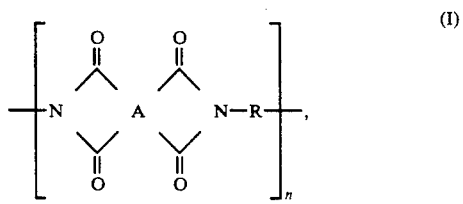

(I)

The foams have an elevated thermostability and, determined in a thermogravimetric analysis at a heating rate of 20 degrees per minute, have a maximum weight loss between 550° and 650° C. The overall weight loss up to a heating temperature of 350° C. amounts to less than 3% by mass.

7 Claims, No Drawings

FLAME-RETARDANT, HIGH-TEMPERATURE RESISTANT FOAMS OF POLYIMIDES

The invention relates to flame-retardant, high-temperature resistant foams of polyimides as well as to a process for preparing the same.

The field of application of polyimide foams is extremely versatile. They are used, for instance, for thermally and acoustically insulating hulls of ships and submarines as well as fuselages, as pipework wrappings, as linings for ventilation ducts, and as shock absorbing means for air transportation containers. Polyimide foams also are used to insulate buildings.

A general process for the production of foams from aromatic polyimides is known from U.S. Pat. No. 3,300,420. According to that process, an organic polyisocyanate is reacted, in the liquid phase and at elevated temperatures, with an aromatic carboxylic anhydride, optionally under catalysis. The anhydride must possess at least one additional substituent capable of reacting with the isocyanate, which substituent also may be another anhydride group. The reaction is self-foaming on account of the carbon dioxide forming. It is carried out by prepolymerizing the reaction partners, whereupon the reaction mixture is maintained at a temperature of between 150° and 370° C. for some time under agitation. According to U.S. Pat. No. 3,300,420, a great variety of aromatic polycarboxylic anhydrides and aromatic polyisocyanates are said to be suitable for the production of high-temperature resistant foams.

A disadvantage of the polyimide foams described is to be seen in their relatively low thermostability. According to U.S. Pat. No. 3,300,420 this is safeguarded up to a temperature of 260° C. only, thus limiting their field of application.

It is the object of the invention to eliminate this disadvantage and to provide a polyimide foamed material that exhibits a higher thermostability.

The flame-retardant, high-temperature resistant polyimide foams according to the invention have the general formula $$\left[-N\underset{\underset{O}{\parallel}}{\overset{\overset{O}{\parallel}}{\diagup\!\!\diagdown}} A \underset{\underset{O}{\parallel}}{\overset{\overset{O}{\parallel}}{\diagdown\!\!\diagup}} N-R-\right]_n, \quad (I)$$

wherein
n is an integer larger than 1,
A is a tetravalent group of the formula

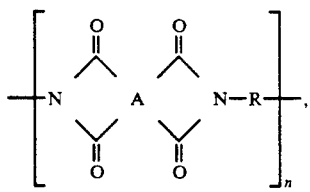 (IIa)

or

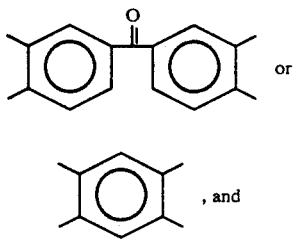 (IIb)

and

R represents at least one of the following bivalent groups of the formulae

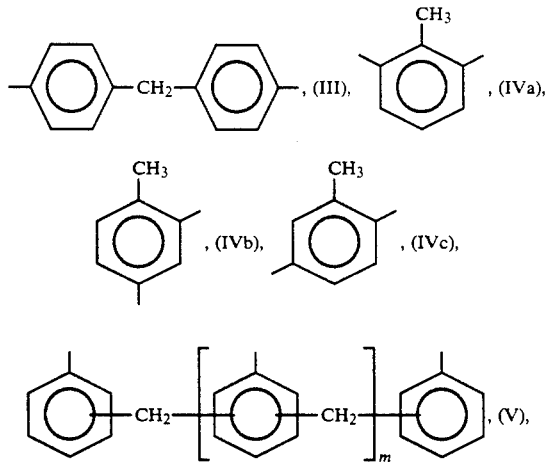

in which m is 0, 1, 2, 3 or 4,
which polyimide foams have a maximum weight loss between 550° and 650° C., in particular between 580° and 650° C., to be determined in a thermogravimetric analysis at a heating rate of 20 degrees per minute, the overall weight loss up to a heating temperature of 350° C. amounting to less than 3% by mass. Accordingly, the polyimide foams of the invention are to be regarded as thermostable up to a temperature of 370° C.

The polyimide foams of the invention are prepared by reacting benzophenone-3,3',4,4'-tetracarboxylic dianhydride (BTDA) or pyromellitic dianhydride with at least one di- or polyisocyanate selected from the group consisting of methylene diphenyl-4,4'-diisocyanate, 2,4-, 2,5-, 2,6-toluene diisocyanate or polymethylenepolyphenylene polyisocyanate of the formula

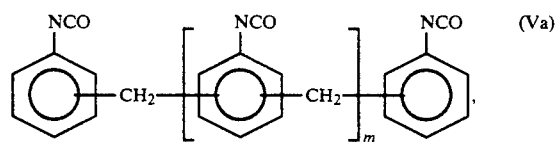 (Va)

in the presence of a reaction accelerator, wherein the tetracarboxylic dianhydride, the di- or polyisocyanate and the reaction accelerator are homogenously mixed at room temperature, the obtained mixture is heated to a temperature of between 200° and 250° C. and is maintained within this temperature range for at least 5 minutes. The process according to the invention is carried out without any solvent.

It has proved that carrying out the reaction at temperatures of above 250° C. involves undesired side reactions. Thus, in particular, by the interreaction of isocyanate groups, carbodiimides will be formed, which adversely affect the properties of the polyimide foams. Impurities caused by carbodiimides, i.e., result in a decrease of thermostability and elasticity.

As the reaction accelerator, a mixture of tertiary amines, preferably triethylene diamine and dimethyl ethanolamine, optimumly in an amount of between 0.1 and 5% by mass, based on the tetracarboxylic dianhydride, may be employed.

An advantageous embodiment of the process according to the invention consists in that it is carried out in the presence of a surface-active substance, preferably based on silicone. The presence of such substances induces the formation of small regular pores and, thus, foams of higher densities.

According to another advantageous embodiment, the tetracarboxylic dianhydride and the di- and/or polyisocyanate are reacted in the mixture at a mol ratio of 1:1.

The invention will be explained in more detail by way of the following examples.

EXAMPLE 1

0.1 g of a mixture of 20% by mol of triethylene diamine and 80% by mol of dimethyl ethanolamine as a reaction accelerator was stirred into a homogenous mixture comprised of 10.0 g finely ground BTDA (grain size <75 μm), 2.27 g diphenylmethane-4,4'-diisocyanate, 1.86 g polymethylenepolyphenylene polyisocyanate (formula Va; m=1 (55%), 2 (28%), 3 and 4 (in total 17%)) and 2.70 g of a mixture of 20% by mol diphenylmethane-4,4'-diisocyanate and 80% by mol toluene diisocyanate (2,4- and 2,6-isomers). This reaction mixture was poured into a preheated steel mold, heated to 220° C. within 5 minutes and maintained at this temperature for another 5 minutes. A solid foam formed, which was removed from the steel mold.

The density of the polyimide foam obtained was determined according to ASTM D1622 and amounted to 9.74 ±0.5 kg/m$^3$.

LOI (limiting oxygen index) value: 40%

Thermogravimetric analysis (heating rate 20° C./min): Weight loss up to 150° C.: 1.13%; Weight loss up to 350° C., in total: 1.24%; Maximum weight loss at 600° C.

EXAMPLE 2

0.5 g of a mixture of 20% by mol of triethylene diamine and 80% by mol of dimethyl ethanolamine as a reaction accelerator were stirred into a homogenous mixture comprised of 10.7 g finely ground BTDA (grain size <75 μm) and 6.35 g of a mixture of 20% by mol diphenylmethane-4,4'-diisocyanate and 80% by mol toluene diisocyanate (2,4- and 2,6-isomers). This reaction mixture was poured into a preheated steel mold, heated to 250° C. within 10 minutes and maintained at this temperature for another 30 minutes. A solid foam formed, which was removed from the steel mold.

The density of the polyimide foam obtained was determined according to ASTM D1622 and amounted to 8.06 ±0.2 kg/m$^3$.

LOI (limiting oxygen index) value: 40%

Thermogravimetric analysis (heating rate 20° C./min): Weight loss up to 150° C.: 1.27%; Weight loss up to 350° C., in total: 2.88%; Maximum weight loss at 610° C.

EXAMPLE 3

0.6 g of a mixture of 20% by mol of triethylene diamine and 80% by mol of dimethyl ethanolamine as a reaction accelerator and 0.15 g polydimethyldisiloxane copolymer as a wetting agent were stirred into a homogenous mixture comprised of 59.44 g finely ground BTDA (grain size <75 μm), 13.6 g diphenylmethane-4,4'-diisocyanate, 11.1 g polymethylene polyphenylene polyisocyanate (formula Va; m=1 (55%), 2 (28%), 3 and 4 (in total 17%)) and 17.0 g toluene diisocyanate (2,4- and 2,6-isomers). This reaction mixture was poured into a preheated steel mold, heated to 250° C.

within 5 minutes and maintained at this temperature for another 10 minutes. A solid foam formed, which was removed from the steel mold.

The density of the polyimide foam obtained was determined according to ASTM D 1622 and amounted to 15.00±0.5 kg/m$^3$.

LOI (limiting oxygen index) value: 40%

Thermogravimetric analysis (heating rate 20° C./min): Weight loss up to 150° C.: 1.42%; Weight loss up to 350° C., in total: 1.89%; Maximum weight loss at 580° C.

What we claim is:

1. A process for producing flame-retardant, high temperature resistant polyimide foams having a maximum weight loss between 550° and 650° C., as determined by thermogravimetric analysis at a heating rate of 20 degrees per minute, the overall weight loss up to a heating temperature of 350° amounting to less than 3% by mass, said foams having the general formula

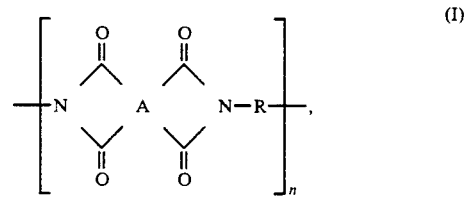

wherein
n is an integer larger than 1,
A is a tetravalent group of the formula

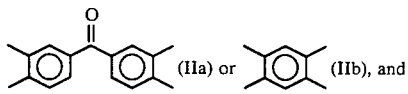

R represents at least one of the following bivalent groups of the formulae

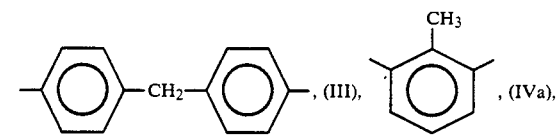

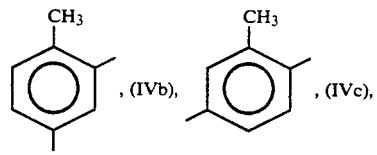

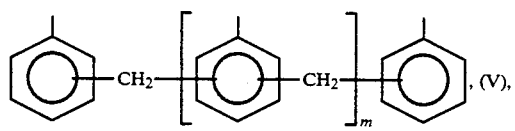

in which m is 0, 1, 2, 3 or 4, which process comprises reacting benzophenone-3,3', 4,4'-tetracarboxylic dianhydride (BTDA) or pyromellitic dianhydride with at least on di- or polyisocyanate selected from the group consisting of methylene diphenyl-4,4'-diisocyanate, 2,4-, 2,5-, 2,6- toluene diisocyanate, or polymethylene polyphenylene polyisocyanate of the formula

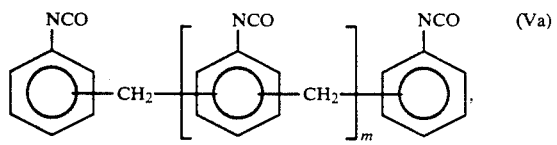

in the presence of a reaction accelerator by homogeneously mixing equimolar amounts of the tetracarboxylic dianhydride, the di- or polyisocyanate with the reaction accelerator at room temperature so as to obtain a mixture wherein said tetracarboxylic dianhydride and said di- or polyisocyanate are contained at the molar ratio of 1:1, and heating said mixture to a temperature of between 200° and 250° C. and maintaining said mixture at this temperature range for at least 5 minutes.

2. A process as set forth in claim 1, wherein said reaction accelerator is comprised of a mixture of tertiary amines.

3. A process as set forth in claim 2, wherein said tertiary amines are selected from the group consisting of triethylene diamine and dimethyl ethanolamine.

4. A process as set forth in claim 2, wherein said reaction accelerator is employed in an amount ranging between 0.1 and 5% by mass, based on said tetracarboxylic dianhydride.

5. A process as set forth in claim 1, which process is carried out in the presence of a surfactant.

6. A process as set forth in claim 5, wherein said surfactant is based on silicone compounds.

7. A process for producing flame-retardant, high temperature resistant polyimide foams said process comprises reacting, under conditions that are substantially free of side reactions, benzophenone-3,3',4,4'-tetracarboxylic dianhydride (BTDA) or pyromellitic dianhydride with at least on di- or polyisocynate selected from the group consisting of methylene diphenyl-4,4'-diisocyanate, 2,4-,2,5-, 2,6- toluene diisocyanate, or polymethylene polyphenylene polyisocyanate of the formula

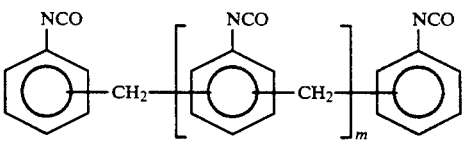

in the presence of a reaction accelerator by homogeneously mixing the tetracarboxylic dianhydride, the di- or polyisocyanate with the reaction accelerator at room temperature so as to obtain a mixture and heating said mixture to a temperature of between 200° and 250° C. and maintaining said mixture at said temperature for at least about 5 minutes.

* * * * *